United States Patent [19]

Swain et al.

[11] Patent Number: 5,125,979
[45] Date of Patent: Jun. 30, 1992

[54] CARBON DIOXIDE SNOW AGGLOMERATION AND ACCELERATION

[75] Inventors: Eugene A. Swain, Webster, N.Y.; Stephen R. Carter; Stuart A. Hoenig, both of Tucson, Ariz.

[73] Assignee: Xerox Corporation, Stamford, Conn.

[21] Appl. No.: 548,323

[22] Filed: Jul. 2, 1990

[51] Int. Cl.⁵ .............................................. B08B 7/00
[52] U.S. Cl. ................................. 134/7; 134/93; 425/7
[58] Field of Search .................... 134/7, 42, 93; 425/7

[56] References Cited

U.S. PATENT DOCUMENTS

| | | |
|---|---|---|
| 3,074,822 | 1/1963 | Walk et al. ............... 134/7 |
| 3,702,519 | 11/1972 | Rice et al. ............... 51/310 |
| 3,708,993 | 1/1973 | Hardt et al. ............... 62/35 |
| 4,038,786 | 8/1977 | Fong ............... 51/320 |
| 4,389,820 | 6/1983 | Fong et al. ............... 51/410 |
| 4,631,250 | 12/1986 | Hayashi ............... 430/329 |
| 4,655,847 | 4/1987 | Ichinoseki et al. ............... 134/7 |
| 4,703,590 | 11/1987 | Westergaard ............... 51/320 |
| 4,707,951 | 11/1987 | Sibot et al. ............... 51/410 |
| 4,727,687 | 3/1988 | Moore ............... 51/410 |
| 4,744,181 | 5/1988 | Moore et al. ............... 51/436 |
| 4,747,421 | 5/1988 | Hayashi ............... 134/201 |
| 4,806,171 | 2/1989 | Whitlock et al. ............... 134/7 |

FOREIGN PATENT DOCUMENTS 2596672A 4/1986 France .
2077157A 12/1987 United Kingdom .

*Primary Examiner*—Theodore Morris
*Assistant Examiner*—Saeed Chaudhry

[57] ABSTRACT

A cleaning process involving expanding carbon dioxide from an orifice into a thermally insulated chamber to form small carbon dioxide particles, retaining the small carbon dioxide particles in the insulating chamber until the small carbon dioxide particles agglomerate into large snowflakes, entraining the large snowflakes in a high velocity vortex of inert gas to accelerate the large snowflakes and directing a stream of the inert gas and accelerated large snowflakes against the surface of a substrate to be cleaned. This process may be carried out with apparatus including means to direct a stream of small carbon dioxide snow particles into an expansion chamber, means to agglomerate the small carbon dioxide particles into large carbon dioxide snowflakes in the expansion chamber, and means to accelerate the large snowflakes with a high velocity inert gas stream.

10 Claims, 2 Drawing Sheets

CARBON DIOXIDE SNOW AGGLOMERATION AND ACCELERATION

BACKGROUND OF THE INVENTION

This invention relates in general to apparatus and processes for agglomerating carbon dioxide snow particles and accelerating the snow particles against a surface to be cleaned.

Various techniques have been devised to cleaning debris such as submicron particles from substrate surfaces. The semiconductor industry has employed high pressure liquids alone or in combination with fine bristled brushes to remove finely particulate contaminants from semiconductor wafers. These processes have achieved some success in removing contaminants, but the brushes scratch the substrate surface and the high pressure liquids tend to erode the delicate surfaces and can even generate an undesirable electric discharge. Also the liquids can not readily be collected after use in brush and high pressure liquid systems.

An improved cleaning system has been discovered in which a mixture of substantially pure solid and gaseous carbon dioxide removes submicron particles from substrate surfaces without the disadvantages associated with the above-described brush and high pressure liquid systems. Pure carbon dioxide (99.99 + %) is expanded from the liquid state to produce dry ice snow which can is blown across a surface to remove submicron particles without scratching the substrate surface. The carbon dioxide snow vaporizes when exposed to ambient temperatures leaving no residue and thereby eliminating the problem of fluid collection.

More recently, apparatus for making carbon dioxide snow and for directing a solid/gas mixture of carbon dioxide to a substrate is described in Hoenig, Stuart A., "Cleaning Surfaces with Dry Ice" (Compressed Air Magazine, August, 1986, pp 22-25). By means of this device, liquid carbon dioxide is depressurized through a long, cylindrical tube of uniform diameter to produce a solid/gas carbon dioxide mixture which is then directed to the substrate surface. A concentrically positioned tube is used to add a flow of dry nitrogen gas to thereby prevent the build-up of condensation.

In U.S. Pat. No. 4,806,171 to Whitlock et al, an orifice is used to provide a pathway for the flow of fluid carbon dioxide into a coalescing chamber where the fine liquid droplets first form and then coalesce into large liquid droplets which are the precursor of the minute solid particles of carbon dioxide which are not normally resolvable by the human eye. The large droplets are formed into solid particles as the feed passes from the coalescing chamber through a second orifice and out of the exit port toward a substrate surface.

INFORMATION DISCLOSURE STATEMENT

U.S. Pat. No. 4,806,171 issued to Whitlock et al. on Feb. 21, 1989—An apparatus is disclosed for removing small particles from a substrate. The apparatus comprises a source of fluid carbon dioxide, a first means for expanding a portion of the fluid carbon dioxide into a first mixture containing a gaseous carbon dioxide and fine droplets of liquid carbon dioxide, coalescing means for converting the first mixture into a second mixture containing gaseous carbon dioxide and larger liquid droplets of carbon dioxide, second expansion means for converting the second mixture into a third mixture containing solid particles of carbon dioxide and gaseous carbon dioxide, and means for directing the third mixture toward the substrate. Also disclosed are methods for removing fine particles from substrates utilizing the subject apparatus. If desired, an annular channel may be employed to form an envelope of nitrogen which surrounds the third mixture of solid particles of carbon dioxide and gaseous carbon dioxide applied to the substrate.

U.S. Pat. No. 3,702,519 issued to Rice et al. on Nov. 14, 1972—A method is disclosed for the removal of unwanted portions of an article such as membranes, burrs and flashing utilizing solid particles of dry ice (carbon dioxide at a temperature colder than about −56° C.) which are impacted against the unwanted portions. Kinetic energy imparted to the dry ice particles causes removal of the unwanted portions of the article upon impact. Various means may be used to impact the dry ice particles on the unwanted portions of an article. For instance, a gas stream can be driven through a conventional aspirator nozzle such that dry ice particles are aspirated into the gas stream through a conduit leading into the stream using a vacuum effect. The dry ice particles can be supplied directly to a gas stream which then exits through a nozzle. Gas blowers or "airless" mechanical impellers for the dry ice particles can be used. Air at 50° to 150° psig is particularly preferred to aspirate and then drive the dry ice particles for impaction.

U.S. Pat. No. 4,038,786 issued to Fong on Aug. 2, 1977—A process is disclosed for sandblasting with pellets capable of sublimation. Particles are discharged from a nozzle at sonic velocity to maximize their momentum as they are directed toward the surface to be treated.

U.S. Pat. No. 4,389,820 issued to Fong et al on Jun. 28, 1983—A blasting machine is disclosed utilizing sublimable particles. The blasting machine comprises means producing particles having a substantially uniform length, dispensing means for receiving the particles and for introducing the particles into a low pressure transport gas flow, and a nozzle for accelerating the particles and having a high pressure, low velocity gas flow coupled to it, the nozzle being adapted to convert the high pressure, low velocity gas into a low pressure, high velocity gas flow. A conduit coupled to the nozzle and the dispensing means receives the particles and introduces the particles into the low pressure, high velocity gas flow within the nozzle which entrains the particles and accelerates them to a high velocity.

U.S. Pat. No. 4,631,250 issued to Hayashi on Dec. 23, 1986—Processes are disclosed for removing covering films by blowing carbon dioxide particles against the film. Fine ice particles may be mixed with the $CO_2$ particles. The covering film may, for example, be a photoresist film. Acceleration of the particles is accomplished with the aid of nitrogen gas introduced into a side portion of a nozzle.

U.S. Pat. No. 4,747,421 issued to Hayashi on May 31, 1988—Apparatus is disclosed for removing covering films by blowing carbon dioxide particles against the film. Fine ice particles may be mixed with the $CO_2$ particles. The covering film may, for example, be a photoresist film. Acceleration of the particles is accomplished with the aid of nitrogen gas introduced into side portion of a nozzle.

U.S. Pat. No. 4,655,847 issued to Ichinoseki et al. on Apr. 7, 1987—A cleaning method is disclosed comprising blasting a mixture of abrasive dry-ice particles and abrasive ice particles against an object to be cleaned.

U.S. Pat. No. 4,703,590 issued to Westergaard on Nov. 3, 1987—An apparatus and method are disclosed for particle blasting using particles of a material that changes its state.

U.S. Pat. No. 4,707,951 issued to Gibot et al. on Nov. 24, 1987—An installation is disclosed for the projection of particles of dry ice comprising a grinding mill, a metering device and a propelling device. Such installation may be employed for cleaning surfaces in the nuclear industry.

U.S. Pat. No. 4,727,687 issued to Moore on Mar. 1, 1988—Cryogenic cleaning apparatus is disclosed which uses dry ice pellets having a pellet extruder and static means to break the extruded dry ice.

U.S. Pat. No. 4,744,181 issued to Moore et al. on May 17, 1988—A particle blast cleaning apparatus and process are disclosed which utilize sublimable pellets.

FR 2596-672-A published Sep. 10, 1987—An apparatus is disclosed for cleaning surfaces using hot pressurized water to propel dried particles on the surface to be cleaned.

UK GB 2,077,157 published Dec. 16, 1981—A surface treatment process is disclosed in which surface material is removed by bombardment with cooled shot grit or other suitable particles. The surface under treatment may also be cooled by spray nozzles.

U.S. Pat. No. 3,702,519 issued to Rice on Nov. 14, 1972—A method is disclosed for removing unwanted portions of an article such as membranes, burrs and flashing utilizing solid particles of dry ice which are impacted against the unwanted portions.

U.S. Pat. No. 4,389,920 issued to Fong et al. on Jun. 28, 1983—A blasting machine is disclosed which utilizes sublimable particles. The blasting machine forms dry ice pellets and supplies them to a blasting nozzle.

U.S. Pat. No. 4,038,786 issued to Fong on Aug. 2, 1977—A sandblasting process is disclosed in which pellets are propelled against a surface by a stream of pressurized gas. The pellets are solid particles of a material which sublimes after engaging the surface that is blasted.

U.S. Pat. No. 3,708,993 issued to Hardt et al. on Jan. 9, 1973—Apparatus and a method are disclosed for forming pellets of solid $CO_2$. The pellets are formed by extruding dry ice through passages having a frusto-conical section.

U.S. Pat. No. 3,074,822 issued to Walk et al. on Jan. 22, 1963—A method is disclosed for cleaning surfaces of devices such as gas turbines using frozen dioxane or similar chemical or combinations of crushed, frozen dioxane and dry ice.

U.S. Pat. No. 4,707,951 issued to Gibot et al. on Nov. 24, 1987—An installation is disclosed for the projection of preformed particles of dry ice.

When carbon dioxide particle cleaning techniques are utilized to clean surfaces it is also often difficult to achieve clean the surfaces because the dirt particles removed by the carbon dioxide particles tend to suspend in the air and redeposit on surfaces that were previously cleaned. Moreover, since the extruded carbon dioxide pellets are inherently large, the large pellets often damage delicate surfaces.

Despite being able to remove some submicron particles, the aforementioned devices suffer from several disadvantages. For example, when extruded carbon dioxide pellets are utilized to clean surfaces, the inherently large extruded carbon dioxide pellets often damage delicate surfaces to be cleaned. It is also known that carbon dioxide snowflakes provide a cleaning action when impinged on a smooth surface. Larger snowflakes will clean larger areas on the surface to be cleaned. When small snowflakes are agglomerated into larger snowflakes, the larger snowflakes lose velocity. This loss in velocity causes a reduction in impact force when the larger snowflakes strike the surfaces to be cleaned and cleaning effectiveness is adversely affected. Thus, the characteristics of carbon dioxide cleaning systems exhibit deficiencies for meeting the precise pristine surface requirements for delicate substrates used in high quality electronic and other devices.

SUMMARY OF THE INVENTION

It is an object of the invention to overcome the above-noted deficiencies by providing a process and apparatus for cleaning surfaces.

It is an another object of the invention to provide a cleaning system that prevents or eliminates particulate contamination on a surface after cleaning.

It is still another object of the invention to provide a cleaning system that eliminates the need for complex solvent recovery systems.

It is another object of the invention to provide a cleaning system that is simple and has few moving parts.

It is still another object of the invention to provide a cleaning system that readily cleans large surfaces.

It is another object of the invention to provide a simple cleaning method which is free from chlorofluorocarbon material, solvents, and associated disposal and environmental problems.

Thus, the characteristics of cylinder cleaning systems exhibit deficiencies for meeting the precise pristine surface requirements for substrates used in high quality photoreceptors.

These and other objects are accomplished by the present invention by providing a cleaning process comprising expanding carbon dioxide from an orifice into a thermally insulated chamber to form small carbon dioxide particles, retaining the small carbon dioxide particles in the insulating chamber until the small carbon dioxide particles agglomerate into large snowflakes, entraining the large snowflakes in a high velocity vortex of inert gas to accelerate the large snowflakes and directing a stream of the inert gas and accelerated large snowflakes against the surface of a substrate to be cleaned. This process may be carried out with apparatus comprising means to direct a stream of small carbon dioxide snow particles into an expansion chamber, means to agglomerate the small carbon dioxide particles into large carbon dioxide snowflakes in the expansion chamber, and means to accelerate the large snowflakes with a high velocity inert gas stream.

BRIEF DESCRIPTION OF THE DRAWINGS

A more complete understanding of the process and apparatus of the present invention can be obtained by reference to the accompanying drawings wherein.

These figures merely schematically illustrate the invention and are not intended to indicate relative size and dimensions of actual carbon dioxide snowflake agglomerating and accelerating apparatus or components thereof. Also, the carbon dioxide snow flake particles are represented by round dots rather than their actual irregular shape.

DESCRIPTION OF THE PREFERRED EMBODIMENTS

Figure 1:
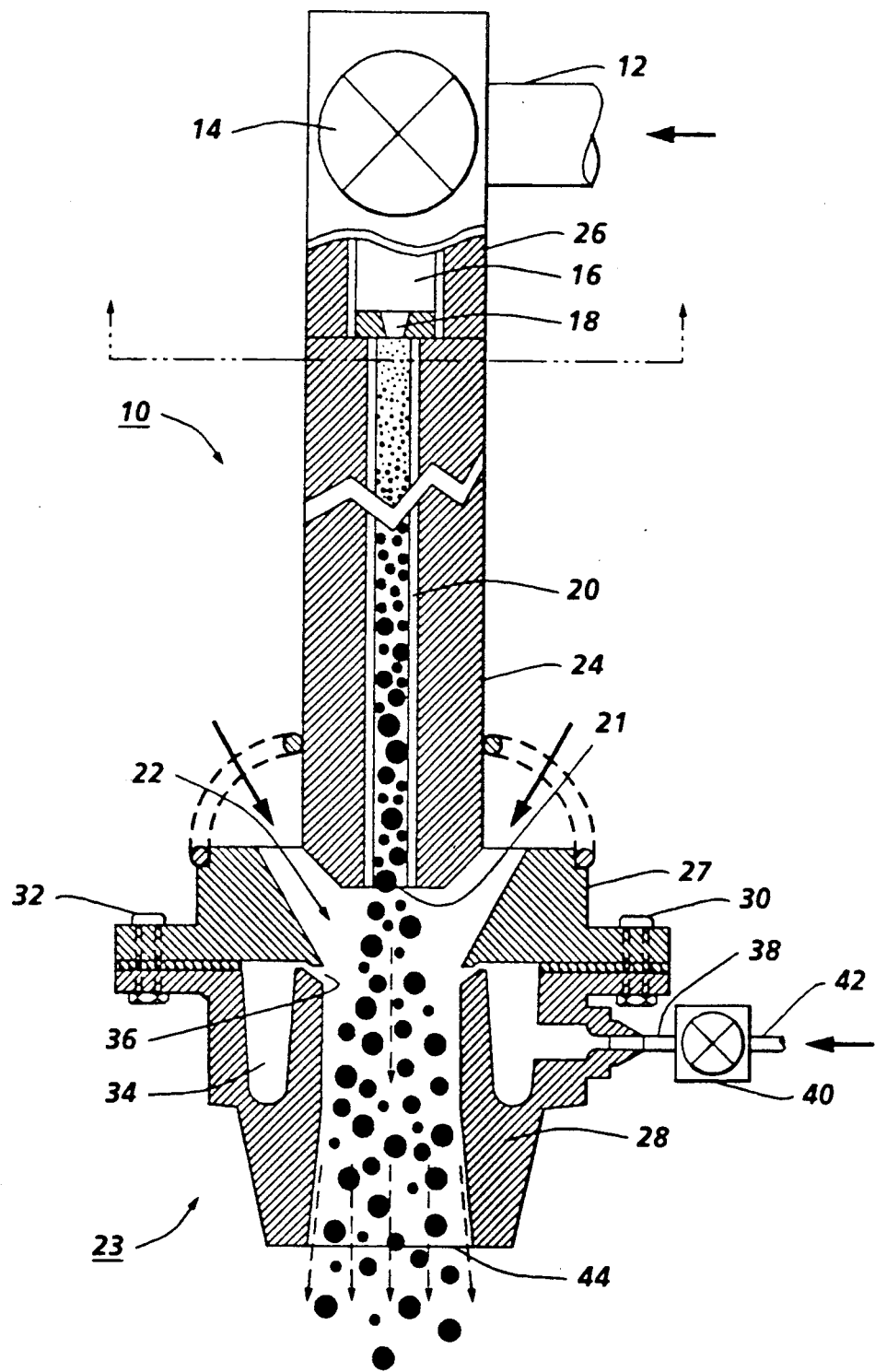
FIG. 1 is a schematic, sectional view in elevation showing carbon dioxide snowflake agglomerating and accelerating apparatus
Figure 2:
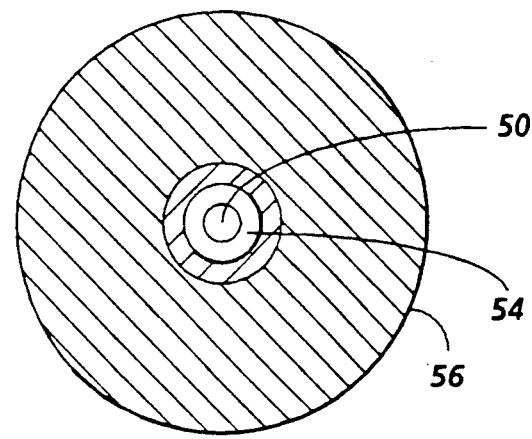
FIG. 2 is a schematic cross sectional view showing carbon dioxide snowflake agglomerating and accelerating apparatus having a circular cross section.
Figure 3:
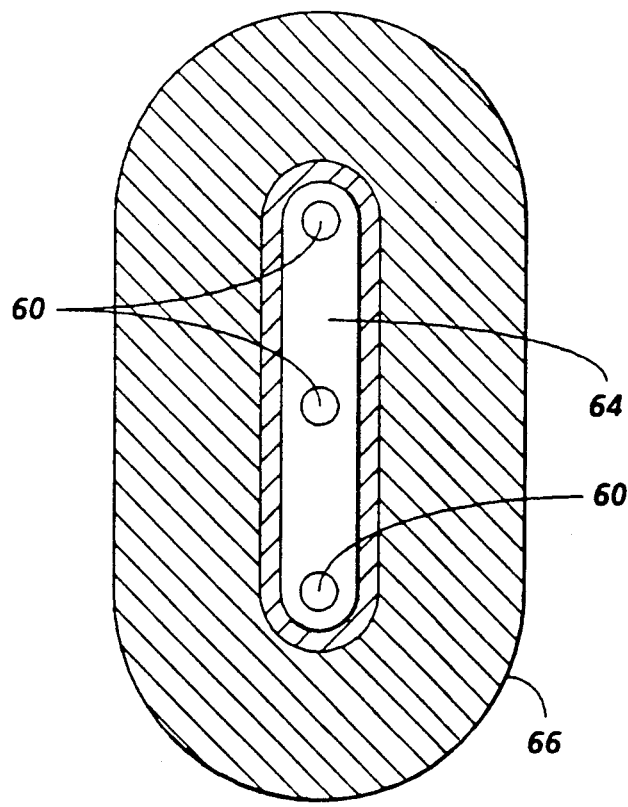
FIG. 3 is a schematic cross sectional view showing carbon dioxide snowflake agglomerating and accelerating apparatus having an oval cross section.

The snow flake cleaning system 10 of this invention is illustrated in FIG. 1 and comprises an inlet line 12, a control valve 14 and small expansion chamber 16. A small orifice 18 connects small expansion chamber 16 with one end of a large expansion chamber 20. The cross section of the expansion chambers may be of any suitable shape such as circular cross section as shown in FIG. 2 or an oval cross section as illustrated in FIG. 3. The end of large expansion chamber 20 opposite the end adjacent orifice 18, forms an outlet 21 which is spaced from the entrance to acceleration chamber 22 of vortex nozzle 23. Both the large expansion chamber 20 and small expansion chamber 16 are enclosed with thermal insulating material 24 and 26, respectively. Acceleration chamber 22 is enclosed within a housing comprising two sections, 27 and 28, bolted together by bolts 30 and 32 to form an annular chamber 34 and a ring nozzle 36. Annular chamber 34 is connected through an inlet line 38 through a valve 40 to feed line 42. A shim 43 having the desired thickness is sandwiched between housing sections, 27 and 28 to control the size of the opening of ring nozzle 36. During a cleaning operation, the stream of carbon dioxide snowflakes emitted from outlet 44 of vortex nozzle 23 is preferably aligned at a low angle of attack (angle between stream of carbon dioxide particles from vortex nozzle 23 and plane of surface being cleaned) of between about 10° and about 30° for maximum effectiveness in removing debris from the surface of the substrate being cleaned.

Illustrated in FIG. 2 is a cross section of one embodiment of the device shown in FIG. 1 in which a single orifice 50 is employed in large expansion chamber 54 which has a circular cross section surrounded by thermal insulating material 56. The acceleration chamber (not shown) would also have a circular cross section.

In FIG. 3 a cross section is shown of another embodiment of the device illustrated in FIG. 1. In this embodiment, a plurality of orifices 60 are employed in large expansion chamber 64 which has an oval cross section surrounded by thermal insulating material 66. The acceleration chamber (not shown) would also have an oval cross section. Although less desirable, other cross sectional shapes such as a rectangular shape may be utilized.

In operation, liquid carbon dioxide is introduced from a source such as a storage tank (not shown) by opening a conventional valve (not shown) on a line from the tank to inlet line 12. Although the valve on the tank may be used to control flow rate, an optional control valve 14 may also be used to control the flow rate of carbon dioxide. The carbon dioxide from inlet line 12 may be led into an optional small expansion chamber 16. Any suitable control valve may be used for valve 14 such as a needle valve (e.g. Model SS2-A Needle Valve, available from Nupro) or the like, may be used to regulate the flow rate of liquid carbon dioxide into the snow flake cleaning system 10 of this invention. Typically, the liquid carbon dioxide is initially at a pressure of about 63.3 Kg/sq cm (900 lbs per square inch) and the flow rate is regulated to a rate between about 1.4 Kg/min (3 lb/min) and about 3.2 Kg/min (7 lb/min) for an expansion chamber having a circular cross section of about 1.75 sq cm. A typical flow rate of the liquid carbon dioxide into the first expansion chamber is about 2.3 Kg (5 lbs) per minute. The liquid carbon dioxide is introduced from control valve 14 into optional small expansion chamber 16 where some small particles of carbon dioxide snowflakes may be formed. The fluid carbon dioxide and carbon dioxide small snowflakes are thereafter funneled through small orifice 18 into large expansion chamber 20 where additional small snowflakes are formed and thereafter allowed to contact each other to form large snowflakes. Small orifice 18 typically has a diameter of between about 500 micrometers and about 1,000 micrometers. The size of small orifice 18 will vary depending upon the flow rate of the carbon dioxide selected. Generally, the small orifice 18 size should be sufficient to form between about 20 percent and about 80 percent small carbon dioxide solid particles based on the total weight of the carbon dioxide passing through small orifice 18. Sufficient carbon dioxide gas should flow through orifice 18 to suspend the solid carbon dioxide particles that are formed. Orifice 18 may comprise any suitable organic or inorganic material. Typical materials include polyvinylidene fluoride (Kynar, available from Pennwalt Corporation), sapphire, stainless steel, tungsten carbide, and the like. The length of large expansion chamber 20 should be sufficient to ensure an increase in the size of the original small carbon dioxide particles to an average particle size of at least about 30 times larger than the average particle size of the original small particles emerging from small orifice 18. Preferably, the increase in size is at least about 50 times larger than the average snowflake size of the original small snowflakes emerging from small orifice 18. Typically, large expansion chamber 20 has a height or diameter (if the cross section is circular) between about 10 mm and about 20 mm and a length of between about 25 cm and about 120 cm when a single orifice is employed. There appears to be no maximum width limitation for oval or rectangular or other oblong cross-sectional shapes or diameter limitation for circular cross sectional shapes so long as a sufficient number of orifices 18 are employed to achieve flow rates which form, suspend and transport the carbon dioxide particles through the large expansion chamber. The size of the snowflakes may be plotted against the length of large expansion chamber 20 to form a curve in which the size of the snowflakes grow as they dwell in large expansion chamber 20 until a plateau is reached and further lengthening of large expansion chamber 20 does not contribute to further enlargement of the size of the carbon dioxide snowflakes. This plateau size is the optimum size. Although the length of chamber 20 may be expanded beyond the point where the plateau is reached, such lengthening is less desirable for practical reasons such as additional cost of the expanded chamber, pressure drop of the flowing carbon dioxide flakes and the like. Both small expansion chamber 16 and the large expansion chamber 20 are enclosed by suitable thermal insulating material 24 and 26 to minimize subliming of the carbon dioxide snowflakes. Typical thermal insulating materials include glass fibers, and closed cell foams comprising polymers such as polyurethane, polyethylene, polystyrene, and the like. Generally, thermal insulation thicknesses of up to about 2 cm may conveniently be employed. If desired, the thermal installation around the small expansion chamber 16 and the large expansion chamber 20 may be omitted. However, removal of the installation will result in greater sublimation of the snowflakes with a resulting smaller size to the agglomerated snowflakes. Small expansion chamber 16 is believed to be an optional chamber and the liquid carbon dioxide may, if desired, be introduced directly from a supply source into the large expansion chamber through any suitable valve with the small expansion chamber 16 being omitted.

As the small snowflakes agglomerate into large snowflakes in large expansion chamber 20, the velocity of the snowflakes along the length of large expansion chamber 20 diminishes. Thus, for optimum cleaning of substrates, the large snowflakes must be accelerated so that greater mechanical energy is imparted to the snowflakes prior to impaction with the substrate to be cleaned.

The agglomerated snowflakes exiting from outlet 21 of large expansion chamber 20 are introduced into acceleration chamber 22 to accelerate and further agglomerate the snowflakes. Outlet 21 is spaced from the entrance to acceleration chamber 22 of vortex nozzle 23 to allow clean, dry gas such as filtered nitrogen or air to be sucked into the vortex nozzle along with the carbon dioxide gas and snowflakes from outlet 21. The amount of spacing between insulation material 24 and vortex nozzle 23 should be sufficient to prevent obstruction of flow of the clean, dry, gas into the vortex nozzle 23 along with the carbon dioxide gas and snowflakes from outlet 21, but preferably less than about 5 cm. For example, excellent results may be obtained with a spacing of about 1 cm. If desired, the spacing between insulation material 24 and vortex nozzle 23 may be enclosed in a suitable housing such as a manifold (not shown) that supplies the clean, dry, gas into the vortex nozzle. Acceleration chamber 22 has a generally conical entrance, a constricted throat, and an exit which gradually increases in diameter. Compressed gas is introduced through feed line 42, valve 40, annular chamber 34, and ring nozzle 36 into acceleration chamber 22 at high velocity. The resulting primary high velocity gas stream from ring nozzle 36 adheres to the coanda profile and is directed toward the outlet 44 of acceleration chamber 22. A low pressure area is created at outlet 44 of acceleration chamber 22. This low pressure region induces high volumes of a second gas to enter the space between outlet 21 exit of large expansion chamber 20 and the entrance of acceleration chamber 22 and combine with the stream of large snowflakes emerging from outlet 21. This secondary stream of a second gas and stream of large snowflakes combine with the primary stream of gas introduced into acceleration chamber 22 through the ring nozzle 36. The combined flow of the primary, secondary and snowflake streams exhaust from the outlet 44 of acceleration chamber 22 as a high volume, high velocity stream.

Generally, the amplification of the velocity of the stream of large snowflakes is at least about 1:2. A velocity amplification of at least about 1:3 is preferred for more effective cleaning. Excellent cleaning velocities have been achieved with a volume amplification ratio of between about 1:14, e.g., a volume of 1 SCFM (standard cubic feet per minute) into the entrance of the vortex nozzle exits at 14 SCFM. By forming large snowflakes, mass is increased and the kinetic energy of the snowflakes are increased, to achieve greater scrubbing effectiveness. Thus, undesirable debris clinging to the surface of substrates to be cleaned is more effectively removed. The high kinetic energy of the large snowflakes dislodges the material surface on the substrate surface and also freezes the debris. The impact of the snowflakes against the substrate temporarily heats the snowflakes to a liquid form and subsequently refreezes.

Any suitable vortex nozzle may be employed to accelerate the large snowflakes. Excellent results have been achieved with an acceleration chamber enclosed in a vortex nozzle having a 1:14 volume amplification (Brauer AM20, Model 6021, available from EXAIR Corporation).

In U.S. Pat. No. 4,806,171 issued to Whitlock et al on Feb. 21, 1989, an apparatus is disclosed for removing small particles from a substrate comprising a source of fluid carbon dioxide, a first means for expanding a portion of the fluid carbon dioxide into a first mixture containing gaseous carbon dioxide and fine drops of liquid carbon dioxide, coalescing the means for converting the first mixture into a second mixture containing a gaseous carbon dioxide and larger liquid droplets of carbon dioxide, second expansion means for converting said second mixture into a third mixture containing solid particles of carbon dioxide and gaseous carbon dioxide, and means for directing said third mixture towards the substrate. This process of Whitlock et al is distinguishable from the process of the instant invention in that the process of the instant invention forms large carbon dioxide particles which clean a larger surface area per unit time than small carbon dioxide particles. Also, by impacting the large carbon dioxide particles at a low angle of attack (angle between stream of carbon dioxide particles from vortex and plane of surface being cleaned) of between about 10° and about 30°, the large particles slide across the surface being cleaned, removing debris as they slide thereby contacting a larger surface area per unit time compared to small particles. Moreover, because the carbon dioxide particles are large, they do not sublime away as rapidly as small carbon dioxide particles thereby surviving longer and dislodging more debris along a longer and wider path. Further, each large, rapidly moving carbon dioxide particle possesses more kinetic energy than small carbon dioxide particles and, therefore, more effectively dislodges debris cling to the surface of substrates being cleaned.

By agglomerating small carbon dioxide snowflakes into large snowflakes and accelerating the large snowflakes to a high velocity, improved cleaning action is achieved with the process and apparatus of this invention. The cleaning system of this invention eliminates residue on a surface after cleaning and eliminates the need for complex solvent recovery systems. Moreover, the cleaning system of this invention is simple and has few moving parts. In addition the cleaning system of this invention readily cleans large surfaces and is free of any dependence on chlorofluorocarbon material.

The invention will now be described in detail with respect to the specific preferred embodiments thereof along with a control example, it being understood that these examples are intended to be illustrative only and that the invention is not intended to be limited to the materials, conditions, process parameters and the like recited herein. All parts and percentages are by weight unless otherwise indicated.

EXAMPLE I

A carbon dioxide cleaning device similar to that illustrated in FIGS. 1 and 2 was assembled. Liquid carbon dioxide initially at a pressure of about 63.3 Kg/sq cm (900 lbs. per square inch was introduced from a storage tank by opening a conventional valve on a line from the tank to a needle valve (Model SS2-A Needle Valve, available from Nupro). Carbon dioxide from the needle valve was fed into one end of a small expansion chamber formed from Teflon tubing having a circular cross section of about 1.75 sq cm and a length of about 40 cm. The needle valve was adjusted to regulate the flow rate of liquid carbon dioxide into the small expansion chamber at a rate of about 2.3 Kg (5 lbs.) per minute. Fluid carbon dioxide and carbon dioxide small snowflakes from the small expansion chamber were thereafter fed through a small orifice in a polyvinylidene fluoride (Kynar, available from Pennwalt Corporation) disk having a thickness of about 10 mm into a large expansion chamber formed from Teflon tubing having an inside diameter of about 1.6 cm and a length of about 40 cm. The orifice having a diameter of 700 micrometers. The carbon dioxide particles formed in the small expansion chamber and the additional small snowflakes initially formed in the large expansion chamber contacted each other as they were carried by carbon dioxide gas through the large expansion chamber to form large snowflakes. The length of the large expansion chamber was sufficient to achieve an increase in the size of the original small carbon dioxide particles to an average size of at least about 30 times larger than the average snowflake size of the original small snowflakes emerging from the small orifice. Both the small expansion chamber and the large expansion chamber were covered with a 1.25 cm thick thermal insulating layer of closed cell polyurethane. Typical thermal insulating materials include glass fibers, and closed cell foams comprising polymers such as polyurethane, polyethylene, polystyrene, and the like. The large agglomerated snowflakes exiting from the open end of the large expansion chamber were directed against the surface of a flat metallized polyester film at an attack angle of about 20°. The distance between the open end of the large expansion chamber and the metal surface (measured along the length of the snowflake stream) was maintained at about 5 cm. The effectiveness of cleaning was measured by seeding the surface of the metallized film prior to cleaning with a fluorescent powder having a particle size of between about 1 micrometer and about 30 micrometers. Analysis of cleaning effectiveness was made by exposing the surface to long wave ultraviolet light to excite and render visible the fluorescent particles and examining the surface with a 100 power microscope. Cleaning of the area closely adjacent to and downstream of the zone of initial carbon dioxide snowflake impact was good. As the distance downstream from the initial impact area increased, the degree of cleaning was lower due to the loss of energy by the snowflakes during agglomeration. A significant amount of fluorescent debris was observed starting approximately 10 cm downstream from the center of the initial snowflake impact zone.

EXAMPLE II

A carbon dioxide cleaning device identical to that described in Example I was coupled to a vortex nozzle and all the process conditions of Example I were repeated except that the large agglomerated snowflakes exiting from the open end of the large expansion chamber were not sent directly against the surface to be cleaned and the distance of the open end of the large expansion chamber to the surface being cleaned was slightly greater due to the presence of the vortex. More specifically, the large agglomerated snowflakes exiting from the open end of the large expansion chamber were introduced into the acceleration chamber of a vortex nozzle having a 1:14 amplification (Brauer AM 20, Model 6021, available from EXAIR Corporation). This vortex nozzle had a generally conical entrance, a constricted throat, and an exit which gradually increased in diameter. The open end of the large expansion chamber was positioned about 1 cm from the conical entrance of the vortex nozzle and held in place by a spider type centering device made of small diameter polished stainless steel wire. Compressed nitrogen gas at a pressure of 3.5 Kg/sq cm was introduced through a valve into an annular chamber of the vortex nozzle and out through a ring nozzle into acceleration chamber of the nozzle at high velocity. The resulting primary high velocity gas stream from the ring nozzle adhered to the coanda profile and was directed toward the outlet of the acceleration chamber of the vortex nozzle. A low pressure region was created at the outlet of the acceleration chamber which induced high volumes of a secondary gas (air) to enter the space between the open end of the large expansion chamber and the entrance of the vortex nozzle, i.e. the entrance to the acceleration chamber, and combine with the stream of large snowflakes emerging from the open end of the large expansion chamber. This secondary stream of air and the stream of large snowflakes combined with the primary stream of fluid introduced into the acceleration chamber through the ring nozzle. The resulting combined flow of the primary, secondary and snowflake streams was emitted from the outlet of acceleration chamber of the nozzle as a high volume, high velocity stream. The amplification of the velocity of the stream of large snowflakes was greater than about 1:2. The large agglomerated snowflakes exiting from the open end of the vortex nozzle were directed against a flat metallized surface of a polyester film at an attack angle of about 20°. The distance between the open end of the vortex nozzle and the metal surface (measured along the length of the snowflake stream) was maintained at about 7 cm. The effectiveness of cleaning was measured by seeding the surface of the metallized film prior to cleaning with a fluorescent powder having a particle size of between about 1 micrometer and about 30 micrometers. Analysis of cleaning effectiveness was made by exposing the surface to long wave ultraviolet light to excite and render visible the fluorescent particles and examining the surface with a 100 power microscope. The area of effective cleaning (at least 99.8 percent of the seeded particles were removed) was improved from the 10 cm distance downstream from the center of the initial snowflake impact zone achieved in Example I to 30 cm downstream from the center of the initial snowflake impact zone.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. Apparatus for cleaning substrates comprising means to direct liquid carbon dioxide through at least one orifice having a diameter of between about 500 micrometers and about 1,000 micrometers to form a stream of carbon dioxide particles, said carbon dioxide particles comprising between about 20 percent and about 80 percent of the total weight of carbon dioxide passing through said orifice, means including an expansion chamber to agglomerate said carbon dioxide particles into carbon dioxide snowflakes having an average particle size of at least about 30 times larger than the average particle size of the original carbon dioxide particles emerging from said orifice, and means to accelerate said snowflakes by a factor of at least about 1:2 with a high velocity gas stream.

2. Apparatus for cleaning substrates according to claim 1 wherein said stream of carbon dioxide particles is directed into said expansion chamber through a plurality of orifices.

3. Apparatus for cleaning substrates according to claim 1 wherein said expansion chamber has a circular cross section.

4. Apparatus for cleaning substrates according to claim 1 wherein said expansion chamber has an oval cross section.

5. Apparatus for cleaning substrates according to claim 1 wherein said means to accelerate said snowflakes with a high velocity gas stream is a vortex nozzle.

6. A process for cleaning substrates comprising forming a stream of liquid carbon dioxide having a diameter of between about 500 micrometers and about 1,000 micrometers, expanding said liquid carbon dioxide stream in a chamber to form carbon dioxide particles, said carbon dioxide particles comprising between about 20 percent and about 80 percent of the total weight of carbon dioxide passing through said orifice, retaining said carbon dioxide particles in an insulating chamber until said carbon dioxide particles agglomerate into snowflakes having an average particle size of at least about 30 times larger than the average particle size of the original carbon dioxide particles emerging from said orifice, entraining said snowflakes in a high velocity vortex of inert gas to accelerate said snowflakes by a factor of at least about 1:2 and directing a stream of said inert gas and accelerated snowflakes against the surface of a substrate to be cleaned.

7. A process for cleaning substrates according to claim 6 wherein the angle between said stream of inert gas and accelerated snowflakes and plane of said surface is between about 10° and about 30°.

8. A process for cleaning substrates according to claim 6 wherein said entraining of said snowflakes in said high velocity vortex of gas accelerates the velocity of said snowflakes by a factor of at least about 1:3.

9. A process for cleaning substrates according to claim 6 including expanding said liquid carbon dioxide from at least one first orifice into a first chamber to form carbon dioxide particles, introducing said carbon dioxide particles through at least one second orifice into a thermally insulated second chamber larger than said first chamber and retaining said carbon dioxide particles in said second chamber until said carbon dioxide particles agglomerate into snowflakes having an average particle size of at least about 30 times larger than the average particle size of the original small carbon dioxide particles emerging from said second orifice.

10. A process for cleaning substrates comprising forming a stream of liquid carbon dioxide having a diameter of between about 500 micrometers and about 1,000 micrometers, expanding said stream of liquid carbon dioxide in a chamber to form carbon dioxide particles, said carbon dioxide particles comprising between about 20 percent and about 80 percent of the total weight of carbon dioxide passing through said orifice, retaining said carbon dioxide particles in a first stream of carbon dioxide in a thermally insulated chamber until said carbon dioxide particles agglomerate into snowflakes having an average particle size of at least about 30 times larger than the average particle size of the original carbon dioxide particles emerging from said orifice, combining said first stream carrying said snowflakes with a second stream of inert gas and entraining said snowflakes in a high velocity vortex of inert gas to accelerate said snowflakes by a factor of at least about 1:2 and directing the accelerated snowflakes against the surface of a substrate to be cleaned.

* * * * *